(12) United States Patent
Kuwayama et al.

(10) Patent No.: US 8,397,876 B2
(45) Date of Patent: Mar. 19, 2013

(54) CABLE-OPERATED DEVICE AND PARKING BRAKE CONTAINING THE SAME

(75) Inventors: Toshio Kuwayama, Nagoya (JP); Yoshikatsu Tsuge, Nagoya (JP)

(73) Assignee: Chuo Hatsujo Kabushiki Kaisha, Nagoya-shi-Shi (JP)

( * ) Notice: Subject to any disclaimer, the term of this patent is extended or adjusted under 35 U.S.C. 154(b) by 32 days.

(21) Appl. No.: 13/156,650

(22) Filed: Jun. 9, 2011

(65) Prior Publication Data

US 2011/0308903 A1    Dec. 22, 2011

(30) Foreign Application Priority Data

Jun. 18, 2010   (JP) .................................. 2010-139190

(51) Int. Cl.
 *B60T 1/00*   (2006.01)
(52) U.S. Cl. .................................... 188/2 D; 188/106 A
(58) Field of Classification Search .................. 188/2 D, 188/78, 106 A, 106 F, 325, 326, 340; 74/502.5
See application file for complete search history.

(56) References Cited

U.S. PATENT DOCUMENTS

| | | | | |
|---|---|---|---|---|
| 3,015,969 | A * | 1/1962 | Bratz ............................ | 74/502.5 |
| 3,575,266 | A * | 4/1971 | Sitchin ...................... | 188/106 A |
| 5,092,428 | A * | 3/1992 | Kobayashi et al. ....... | 188/106 A |
| 5,366,049 | A * | 11/1994 | Allen ............................ | 188/340 |
| 5,582,074 | A * | 12/1996 | Kelley et al. ................. | 74/502.4 |
| 6,151,983 | A | 11/2000 | Misaki et al. | |
| 6,194,666 | B1 | 2/2001 | Hayashida et al. | |
| 6,612,407 | B2 * | 9/2003 | Jones .............................. | 188/74 |
| 6,651,782 | B2 * | 11/2003 | Asai et al. ..................... | 188/2 D |
| 6,848,745 | B1 | 2/2005 | Tsuge | |
| 2001/0000854 | A1 | 5/2001 | Uneme et al. | |
| 2004/0059448 | A1 | 3/2004 | Nono et al. | |
| 2006/0260288 | A1 | 11/2006 | Graham | |
| 2010/0032631 | A1 * | 2/2010 | Tsuge et al. .................. | 254/389 |
| 2011/0100151 | A1 | 5/2011 | Hasegawa et al. | |

FOREIGN PATENT DOCUMENTS

JP  2009-150468 A  7/2009

OTHER PUBLICATIONS

U.S. Appl. No. 13/048,788, filed Mar. 15, 2011.

* cited by examiner

*Primary Examiner* — Christopher Schwartz
(74) *Attorney, Agent, or Firm* — J-Tek Law PLLC; Jeffrey D. Tekanic (57) ABSTRACT

A cable-operated device (50) suitable for use with a parking brake (10) includes a cable (54) having first end coupled to a lever (52) of a brake mechanism. A supporting member (58) supports at least one longitudinal portion of the cable (54). One end of a coil spring (56) is affixed to the lever (52) and the other end may be affixed to the supporting member (58) or a bracket (81). The cable (54) extends through at least a portion of the coil spring (56). One end of a liner (61) is affixed to the supporting member (58) and the liner (61) surrounds at least a bent portion of the coil spring (56) that is supported on a guide surface (58b).

20 Claims, 5 Drawing Sheets

CABLE-OPERATED DEVICE AND PARKING BRAKE CONTAINING THE SAME

CROSS-REFERENCE TO RELATED APPLICATION

This application claims priority to Japanese Patent Application No. 2010-139190, filed on Jun. 18, 2010, the contents of which are hereby incorporated by reference into the present application.

TECHNICAL FIELD

The present teaching relates to a cable-operated device suitable for use, e.g., in a parking brake of an automobile.

DESCRIPTION OF RELATED ART

A parking brake of an automobile comprises a brake mechanism, a cable having one end connected to the brake mechanism, and a coil spring that surrounds and guides the cable. When the driver operates (pulls) a parking brake lever, an operational (pulling or tensile) force generated by moving the parking brake lever is transferred to the brake mechanism via the cable. Consequently, the brake mechanism shifts from a released (non-braking) state to a braking state, and a braking force is applied to tires of the automobile. When the brake mechanism is shifted to the braking state, the coil spring is compressed and biases the brake mechanism, thereby urging the brake mechanism towards the released (non-braking) state. When the driver operates the parking brake lever to release the braking force, the brake mechanism returns from the braking state to the released state due to the biasing force of the coil spring.

SUMMARY

In recent years, there have been ever increasing demands to make automotive parts smaller and lighter in order to increase fuel efficiency. On the other hand, due to the increasing number of electric devices, such as motors, that are being installed in automobiles, the weight of the automobile tends to increase, thereby counteracting the weight savings achieved by making the individual parts lighter. In addition, if the vehicle weight increases, the braking force generated by the parking brake generally also must increase, which is typically achieved by increasing the diameter of the brake drum and/or by increasing the brake shoe size. However, such design techniques result in an increase in the size of the parking brake and therefore are also contrary to the goal of reducing the size and weight of the automobile. Consequently, there is a long-felt need to be able to increase the braking force without increasing the overall size of the parking brake.

In one aspect of the present teachings, techniques are taught for increasing the braking force of the parking brake without increasing the size of the parking brake. More generally, the present teachings concern techniques for increasing the force-transfer or load-transfer efficiency of a cable-operated device, in particular by reducing friction along a sliding path of the cable and/or a coil spring surrounding the cable.

In another aspect of the present teaching, a cable-operated device may preferably comprise a cable having one end connected to a brake mechanism, a supporting member that supports the cable along a path on which the cable is disposed, a coil spring having one end fixed to the brake mechanism and another end fixed to the supporting member, and having a first hole in which the cable is inserted, and a first liner having one end fixed to the supporting member, and having a second hole in which the cable is inserted. The first liner may be disposed within the first hole. The supporting member may include a guide surface that contacts a side surface of the coil spring. The coil spring may include a first bent portion within a first portion that contacts the guide surface. The other end of the first liner may extend in the direction of the brake mechanism beyond an edge of the guide surface.

Further objects, embodiments and advantages of the present teachings will be apparent to a person of ordinary skill in the art after reading the following detailed description and the appended claims in view of the attached drawings.

DETAILED DESCRIPTION OF THE INVENTION

An investigation performed by the present inventors revealed that improving the load efficiency of a cable is effective for increasing the braking force of a parking brake without increasing the size of the parking brake. Load (force-transfer) efficiency refers to the ratio of the load (force) applied to one end of the cable to the load (force) actually transferred to or experienced at the other (opposite) end of the cable. Thus, even if a driver operates (pulls) a parking brake lever with the same operating force, when the load efficiency is higher, a greater operating (actuating or tensile) force will be transferred to the parking brake mechanism via the cable. As a result, the braking force of the parking brake can be increased without having to increase the size thereof.

A cable-operated device according to the present application may include a supporting member that supports one end of a coil spring. A guide surface configured to guide the coil spring is formed on the supporting member. The guide surface contacts the side (longitudinally-extending) surface of the coil spring and guides or supports the coil spring. The present inventors have also found that a major cause of reduced load efficiency of the cable is the influence of friction between the coil spring and the cable along the guide surface. Therefore, it has been found to be very useful to reduce losses caused by friction between the coil spring and the cable along the guide surface as much as possible.

As will be discussed further below, cable-operated devices according to the present teachings seek to reduce or minimize such friction losses. In cable-operated device according to the present teachings, the cable is routed to the brake mechanism via the supporting member. Therefore, the longitudinally or axially-extending side of the coil spring contacts the guide surface of the supporting member and is bent within the portion where the coil spring contacts the guide surface. The coil spring may also possibly be bent within a portion that is adjacent to where the coil spring contacts the guide surface. Within or along the bent or curved portion of the coil spring, there is an increased likelihood that the coil spring would directly contact the cable during operation if no countermeasures are taken to prevent this direct contact. Thus, in previously-known designs that lacked the first liner according to the present teachings, the cable could directly contact the coil spring during operation. In such a case, force-transfer efficiency losses caused by friction between the coil spring and the cable would increase within the portion where the guide surface contacts the coil spring. As a result, load efficiency is reduced.

However, in the cable-operated devices according to one aspect of the present teachings, the first liner is disposed inside the inner hole of the coil spring, and the cable is inserted through the inner hole of the first liner. One end of the first liner is fixed to the supporting member and the other (opposite) end of the first liner extends beyond the edge of the guide surface in the direction towards the brake mechanism. As a result, the cable can not directly contact the coil spring, because the first liner is disposed between the cable and the coil spring at least within the portion of the coil spring where the guide surface contacts the coil spring. Therefore, frictional losses of the cable can be reduced and load efficiency can be increased. Thus even if the driver operates (pulls) the parking brake lever with the same operating (actuating or tensile) force, the amount of operating (actuating or tensile) force actually transferred to the brake mechanism via the cable will be higher than in known designs which lack the first liner according to the present teachings. Consequently, a parking brake is realized that is capable of increasing the braking force without having to increase the size of the parking brake.

In another aspect of the present teachings, the cable-operated device may further comprise a second liner (or outer sheath) having one end fixed to the supporting member and having a third hole, in which the cable is inserted. Relative to the supporting member, the second liner may be arranged on the side thereof that is opposite to the first liner, such that the supporting member is disposed between the first liner and the second liner. If it were desired to dispose an integrated (single) liner such that it extends from both sides of the supporting member, the liner would have to be inserted into and passed through a through hole of the supporting member, thereby making the attachment (fixing) operation more difficult. However, in the cable-operated devices according to the present teachings, the first liner is separate from the second liner (outer sheath), which means that it is not necessary to pass a single liner through the supporting member, thereby minimizing attachment (fixing) complexity.

In another aspect of the present teachings, the cable-operated device may further comprise a contact member configured to contact the side surface of the coil spring at a second portion along the pathway on which the coil spring is disposed between the supporting member and the brake mechanism. The second portion is closer to the brake mechanism than the first portion that contacts the guide surface. The coil spring further may include a second bent or curved portion within the second portion. The other end of the first liner may extend beyond the second portion in the direction towards the brake mechanism. The coil spring is guided by the contact member. Because the coil spring is bent or curved within the second portion, it is more likely that the coil spring would contact the cable if no countermeasures were taken. However, in cable-operated devices according to this aspect of the present teachings, the other end of the first liner may preferably extend beyond the contact member in the direction towards the brake mechanism. As a result, the cable does not directly contact the coil spring, because the first liner is interleaved between the coil spring and the cable along at least the second portion. Consequently, frictional losses of the cable can be reduced and load efficiency can be increased.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved cable-operated devices and methods for manufacturing the same.

Moreover, combinations of features and steps disclosed in the following detail description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

First Embodiment

Figure 1:
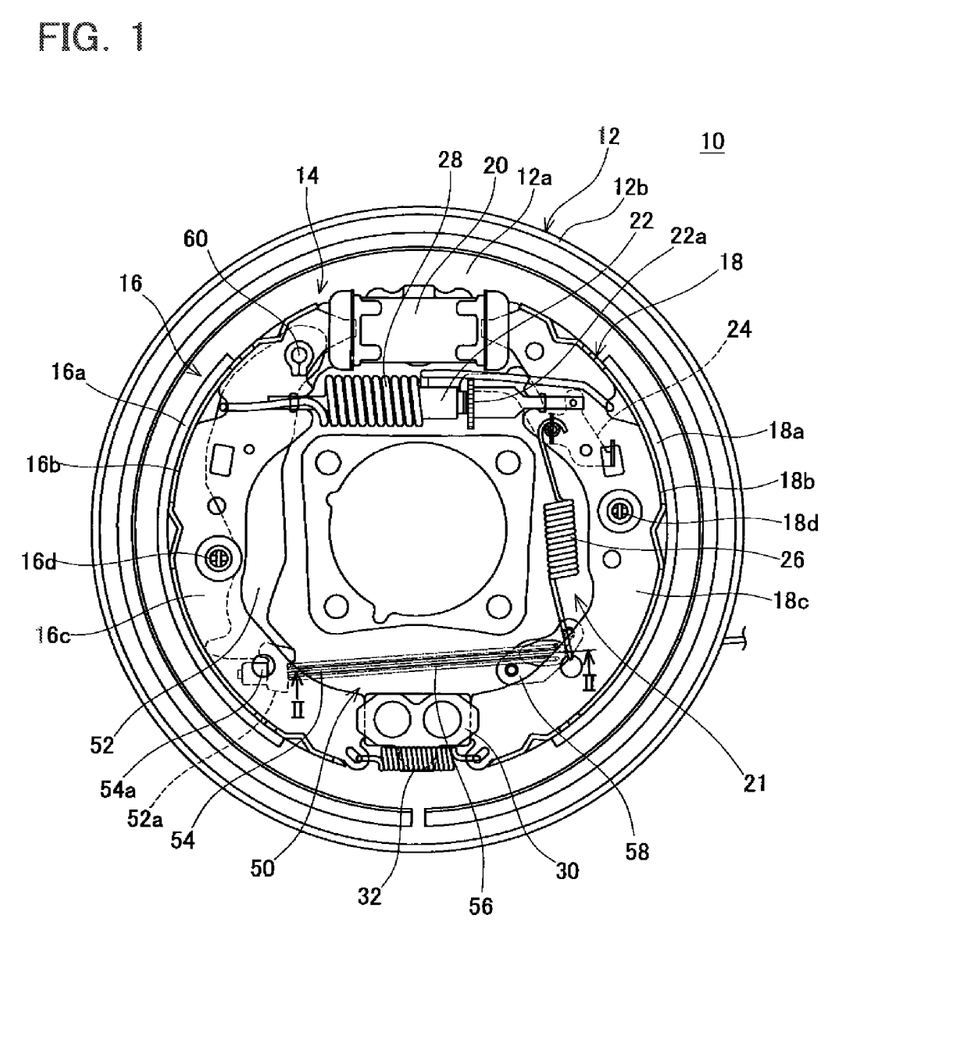
FIG. 1 is a plan view of a parking brake comprising a cable-operated device 50 according to a first embodiment.

An automobile parking brake comprising a cable-operated (cable-actuated) device 50 according to the first embodiment of the present teachings will now be described with reference to the drawings. FIG. 1 is a partially extracted view of a drum-type parking brake 10 that may be disposed, e.g., on a rear wheel axle or spindle of an automobile in order to brake the rear wheel. The parking brake 10 generally comprises a brake mechanism (e.g. 12, 14) and a cable-operated device 50. The brake mechanism comprises a back plate 12, a brake shoe assembly 14, etc.

The back plate 12 comprises a disk-shaped base 12a and a cylindrical outer periphery 12b disposed along the outer peripheral edge of the base 12a. A brake drum (not shown) is preferably disposed around the outer periphery 12b.

The brake shoe assembly 14 comprises brake shoes 16 and 18, a cylinder 20, a separation adjusting device 21, coil springs 28 and 32 and an anchor 30. The brake shoes 16 and 18 are each supported on the base 12a of the back plate 12, and are arranged symmetrically relative to an imaginary vertical line (according to FIG. 1) that divides the brake drum 12 into left and right semi-circular sides. The brake shoe 16 comprises a lining 16a, a rib 16b, and a web (bridge or strut) 16c. The web 16c has a flat plate shape and extends approximately parallel to the back plate 12. The web 16c is elastically supported on the base 12a by a shoe supporting member 16d. An outside edge (the left-side edge in FIG. 1) of the web 16c has an arc shape. The rib 16b is affixed to the radially-outer edge of the web 16c so as to extend generally in the vertical direction of FIG. 1. The lining 16a is adhered to the radially-outer surface of the rib 16b.

Similar to the brake shoe 16, the brake shoe 18 also comprises a lining 18a, a rib 18b, and a web (bridge or strut) 18c.

The web 18c is elastically supported on the base 12a by a shoe supporting member 18d. Since the brake shoe 18 may be configured or constructed in substantially same manner as the brake shoe 16, descriptions of portions that are common to the brake shoes 16, 18 will be omitted. The brake shoe 18 is arranged so as to be symmetrical to the brake shoe 16 relative to the above-described imaginary vertically-extending dividing line.

Upper ends of the webs 16c and 18c respectively engage a piston (not shown) inside the cylinder 20. The cylinder 20 is affixed to the base 12a. The coil spring 28 is arranged below the cylinder 20. The left end of the coil spring 28 engages the web 16c and the right end of the coil spring 28 engages the web 18c. The coil spring 28 biases the brake shoes 16 and 18 in the direction that reduces the separation (the spacing or distance) between the brake shoes 16 and 18 (i.e. towards the imaginary vertically-extending dividing line). In addition, the coil spring 32 is arranged adjacent to the respective lower ends of the webs 16c and 18c. The left end of the coil spring 32 engages the lower end of the web 16c and the right end of the coil spring 32 engages the lower end of the web 18c. The coil spring 32 also biases the brake shoes 16 and 18 in the direction that reduces the separation (spacing or distance) between the brake shoes 16 and 18 (i.e. towards the imaginary vertically-extending dividing line). The anchor 30 is arranged above the coil spring 32. The anchor 30 supports both lower ends of the webs 16c and 18c.

The separation adjusting device 21 comprises a strut 22, a lever 24, a coil spring 26 and a lever 52. The strut 22 is inserted through the inner hole (interior) of the coil spring 28. The right end of the strut 22 engages the web 18c. The left end of the strut 22 engages the lever 52. The strut 22 comprises a dial 22a configured to adjust or change the longitudinal or axial (left-right direction in FIG. 1) length of the strut 22. The dial 22a is arranged so as to be able to abut on one end of the lever 24. The lever 24 is rotatably supported at the right end of the strut 22 and is biased by the coil spring 26 in the counterclockwise direction. One end of the coil spring 26 engages the web 18c. The separation adjusting device 21 rotates the dial 22a to adjust the length of the strut 22 as required by a user, which thereby adjusts the separation (spacing) between the brake shoes 16 and 18. In addition, the length and the set load of the coil spring 56, which will be described below, are also adjusted. The lever 52 is disposed between the web 16c and the base 12a. The lever 52 has a generally flat plate shape that extends in the vertical direction of the parking brake 10. The upper end of the lever 52 is rotatably supported on a fixed pin 60 that penetrates through the upper portion of the web 16c. The left end of the strut 22 is engaged with the lever 52 below the pin 60. A cable supporting portion 52a is formed at a lower end of the lever 52 and has a U-shaped groove cross section.

Figure 2:
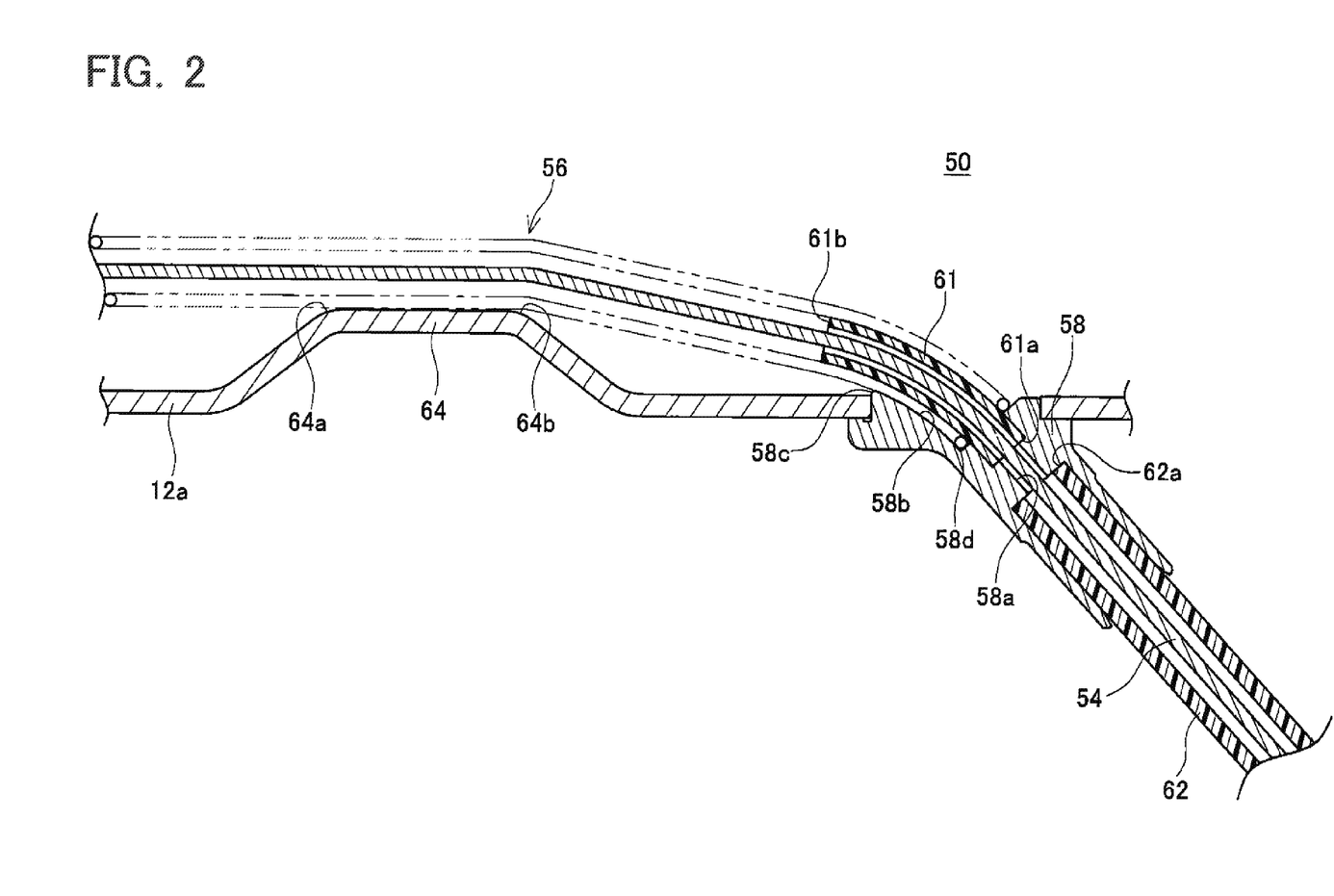
FIG. 2 is a cross-sectional view taken along line II-II in FIG. 1.

Referring now to FIGS. 1 and 2 together, the cable-operated device 50 includes a cable 54, a coil spring 56, a supporting member 58, a (first) liner 61, an outer sheath (outer cable or second liner) 62 and a guide portion 64. One end of the cable 54 is supported by the cable supporting portion 52a of the lever 52. The cable 54 may have a twisted wire structure in which multiple steel wires are twisted together. The entire length of the outer surface of the cable 54 is preferably coated with a resin, e.g., polyamide (PA). The cable 54 is inserted through the inner hole (interior) of the coil spring 56. A pillar-shaped cable end 54a has a diameter that is greater than the coil diameter of the ends of the coil spring 56 and is affixed to one end of the cable 54. The cross section of the cable end 54a may be polygonal shaped, such as a quadrangular prism shape or a hexagonal column shape. The cable end 54a is attached to the left end of the cable supporting portion 52a, thereby affixing the cable 54 to the lever 52. A parking brake lever (not shown) may be connected to the other end of the cable 54.

The coil spring 56 is preferably manufactured from a steel wire having a constant wire diameter. The wire diameter of the coil spring 56 may be, for example, 0.8 to 1.4 mm. In addition, the inner diameter of the coil spring 56 is preferably constant and may be, for example, 4.5 to 6.0 mm and the outer diameter of the coil spring 56 may be, for example, 6.1 to 8.0 mm. Furthermore, the surface of the coil spring 56 may be subjected to a surface treatment (for example, a plate processing technique such as galvanizing or Ni plating) in order to improve its corrosion resistance properties or other related properties. The right end of the coil spring 56 is supported by the supporting member 58. The cable 54 is routed through the through-hole 58a of the supporting member 58 and is supported by the supporting member 58. In FIG. 2, the parking brake is shown in the state in which it has been released, and the lower end of the lever 52 is disposed at its farthest possible position away from the supporting member 58. In this embodiment, the coil spring 56 is mounted on the cable-operated device 50 and the length of the strut 22 is adjustable by the separation adjusting device 21. As illustrated in FIG. 2, the cable 54 passes through the through-hole 58a of the supporting member 58. A guide surface 58b is formed on the supporting member 58. The guide surface 58b contacts a side (longitudinally-extending) surface of the coil spring 56 at a distal end portion of the coil spring 56 and supports or guides the coil spring 56. The guide surface 58b includes a first end 58c and a second end 58d. The first end 58c is the portion at the end of the guide surface 58b on the side of the lever 52 (the left-side in FIG. 2). The second end 58d is the portion at the end of the guide surface 58b on the side of the parking brake lever (the right-side in FIG. 2). The coil spring 56 is pressed against an abutment wall provided at the second end 58d of the supporting member 58.

As shown in FIG. 2, the guide portion 64 formed on the base 12a longitudinally contacts the coil spring 56, thereby supporting and/or guiding the coil spring 56. The guide portion 64 is disposed along a portion of the path of the coil spring 56 between the supporting member 58 and the lever 52 so as to support a longitudinally-intermediate or middle portion of the coil spring 56. The guide portion 64 is formed by bending a portion of the base 12a so that it protrudes toward the coil spring 56. The guide portion 64 includes a first end 64a and a second end 64b. The first end 64a is the portion at the end of the guide portion 64 on the side of the lever 52 (the left-side in FIG. 2). The second end 64b is the portion at the end of the guide portion 64 on the side of the parking brake lever (the right-side in FIG. 2). Respective angled or bent portions of the base 12a adjoin each of the first end 64a and a second end 64b.

The liner 61 extends through the inner hole of the coil spring 56 along the distal end portion of the coil spring 56. By fitting a first end 61a of the liner 61 into the supporting member 58, the liner 61 is mounted such that the liner 61 is affixed to the supporting member 58. A second end 61b of the liner 61 extends inside the coil spring 56 beyond the first end 58c of the guide surface 58b in the direction towards the lever 52 (the left-side in FIG. 2). The cable 54 is inserted into the inner hole of the liner 61. The liner 61 is made of resin and is preferably comprised of a material exhibiting a frictional force with respect to metal that is less than metal, such as e.g., PBT (polybutylene terephthalate) or PTFE (polytetrafluoroethylene).

The outer sheath 62 is a hollow tubular structure that covers or surrounds the outside of the cable 54. The outer sheath 62 is disposed at a position that is opposite of the liner 61 such that the supporting member 58 is disposed between the liner 61 and the outer sheath 62 in the longitudinal direction of the cable 54. By fitting a first end 62a of the outer sheath 62 into the supporting member 58, the outer sheath 62 is mounted such that the outer sheath 62 is affixed to the supporting member 58. The cable 54 is inserted into the inner hole of the outer sheath 62. The other end of the outer sheath 62 may be coupled (directly or indirectly) to the parking brake lever (not shown).

As shown in FIG. 2, the coil spring 56 has been placed into the parking brake 10 and the guide surface 58b of the supporting member 58 contacts the side of the coil spring 56. Thus, a contact portion of the guide surface 58b is defined as the portion of the guide surface 58b that contacts the coil spring 56 between the first end 58c and the second end 58d. The coil spring 56 is bent within the contact portion as well as at portions adjacent to the contact portion in the longitudinal direction of the cable 54. Along the portion where the coil spring 56 is bent, there is an increased likelihood that the coil spring 56 would contact the cable 54 during operation if no countermeasure were taken. However, as was described above, the liner 61 is disposed between the cable 54 and the coil spring 56 at least along this bent portion of the cable 54 and coil spring 56, thereby preventing direct contact.

A representative method for operating the parking brake 10 will now be described.

When the driver of the automobile operates (e.g., pulls) the parking brake lever and the cable 54 is pulled toward the right-hand side of FIG. 1, the lever 52 rotates counter-clockwise around the pin 60. Therefore, with the anchor 30 acting as a fulcrum, the brake shoe 18 will be moved by the strut 22 in the direction away from the brake shoe 16. At the same time, the brake shoe 16 is also moved in the direction away from the brake shoe 18. As a result, the brake shoes 16 and 18 each make contact with the inner peripheral surface of the brake drum, thereby enabling the parking brake. In this state, a force is applied to the coil spring 56 by the lever 52 and the supporting member 58, such that the coil spring 56 is compressed. When the driver of the automobile subsequently operates (releases) the parking brake lever so that the tensile force acting on the cable 54 is relaxed or reduced, the lever 52 will rotate clockwise around the pin 60 due to the biasing force of the coil spring 56. Therefore, the brake shoes 16 and 18 will move towards each other and the parking brake 10 will be released.

If the liner 61 were not provided, the outer circumferential surface of the cable 54 would directly contact the inner hole (surface) of the coil spring 56 along the bent portion of the coil spring 56 (i.e. the portion of the cable 54 disposed between the first end 58c to the second end 58d as well as portions adjacent thereto). Subsequently, as the cable 54 advances and retreats, it is possible that adjacent turns of the coil spring 56 could become caught between the cable 54 and the guide surface 58b, thereby resulting in a greater frictional force acting on the cable 54. In this case, frictional losses may be increased. On the other hand, in the cable-operated device 50 according to the present embodiment, the liner 61 is disposed at least along a bent portion of the coil spring 56. Therefore, at least along this bent portion of the coil spring 56, the cable 54 can not possibly directly contact the coil spring 56 because the liner 61 is interleaved therebetween. Consequently, since the adjacent turns of the coil spring 56 are prevented from becoming directly caught between the cable 54 and the guide surface 58b, it is possible to reliably prevent frictional losses of the cable 54 from increasing during operation due to this phenomenon.

In addition, the inner wall surface of the liner 61 is smoother than the inner wall surface of the coil spring 56. Therefore, by using the liner 61, the frictional force acting on the cable 54 along the bent portion of the coil spring 56 can be reduced. Consequently, the frictional loss of the cable 54 can be reduced.

Furthermore, it may be advantageous to optionally coat or cover the surface of the cable 54 and/or the coil spring 56 with a slide-resistance reducing resin in order to further reduce frictional losses when the cable 54 and/or coil spring 56 slide(s) relative to the liner 61.

As described above, frictional losses between the coil spring 56 and the cable 54 can be reduced by interleaving the liner 61 therebetween, which thus increases the load efficiency of the cable 54. As a result, even if the driver operates (pulls) the parking brake lever with the same operating (pulling or tensile) force, the operating (pulling or tensile) force actually transferred to the lever 52 via the cable 54 increases by utilizing the first embodiment, as compared to embodiments that do not employ the liner 61 and/or a slide-resistance reducing resin coated on the cable 54 and/or coil spring 56. As a result, the braking force can be increased without having to increase the size of the parking brake 10.

Figure 3:
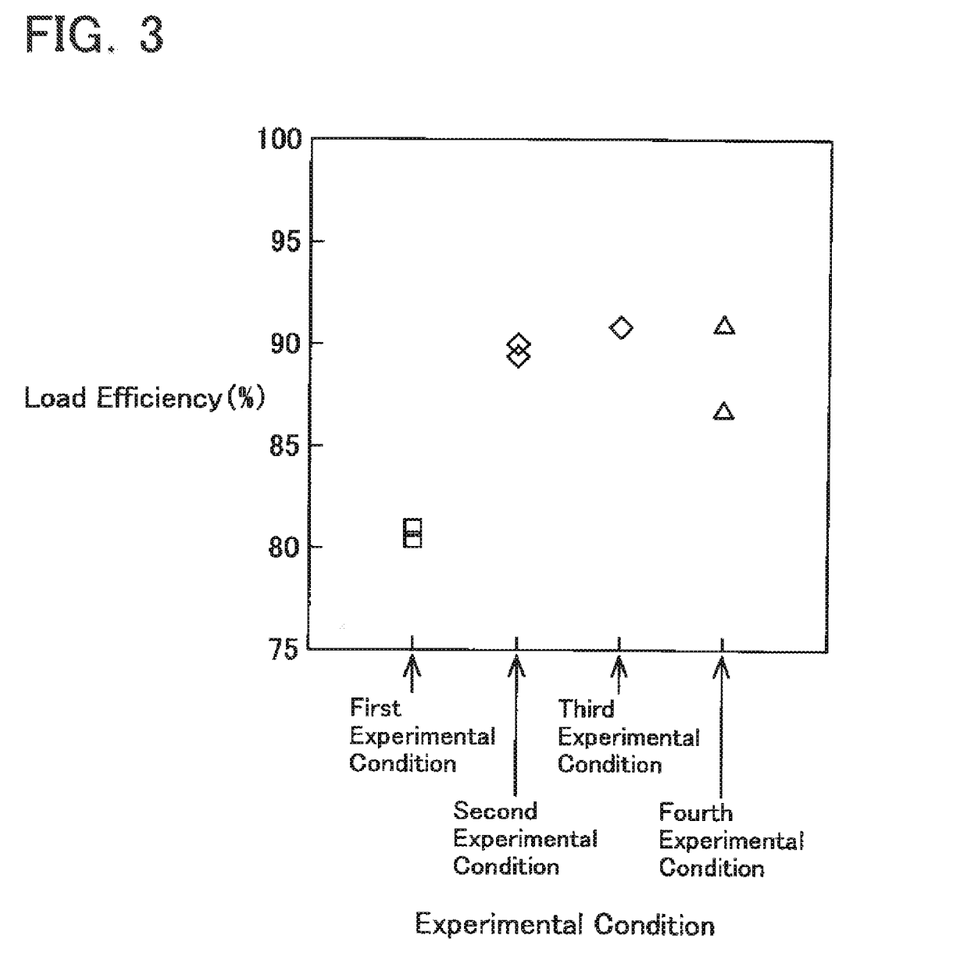
FIG. 3 is a graph showing the results of an experiment that measured the load efficiency of four different embodiments of parking brakes.

FIG. 3 is a graph showing the results of an experiment in which the load efficiency was measured for parking brakes 10 designed according to the present teachings, as well as comparative examples. In FIG. 3, first to fourth experimental conditions are indicated along the abscissa. In the first experimental condition, no liner was provided. The second experimental condition corresponds to the embodiment shown in FIG. 2, in which the liner 61 was interleaved between the cable 54 and the coil spring 56 along the bent portion thereof. In the third experimental condition, an elongated liner 71, which will be described below with reference to the second embodiment, was provided. In the fourth experimental condition, no coil spring 56 was utilized. In other words, the fourth experimental condition differs from the first experimental condition only in that the coil spring 56 was not provided. The corresponding load efficiency is indicated along the ordinate of FIG. 3. In this experiment, the coil spring was made of SWB (hard steel wire) and had a wire diameter of 1.2 mm, an inner diameter of 4.8 mm, and an outer diameter of 7.2 mm. Here, SWB is a material code defined in the Japanese Industrial Standards (JIS) and indicates materials for coil springs (JIS G 3521). The cable 54 was produced by twisting together forty-nine steel wires and covering the outer circumferential surface thereof with PA resin. The liner 61 was formed from PBT. Finally, grease was applied to the cable 54 and the coil spring 56 had a spring constant of 1.89 N/mm.

In the experiment, an input load (force) was input (applied) to the parking brake lever (not shown) of the cable 54 and the resulting output load (force) at the cable end 54a was measured. More particularly, the parking brake lever was operated (pulled) five times at an input load (force) of approximately 1,040 N. After the fifth operation, the output load (force) resulting from an input load of 1,000 N was measured. As is apparent from FIG. 3, the load efficiency was approximately 81% under the first experimental condition (without the liner 61). On the other hand, the load efficiency was approximately 89 to 90% under the second experimental condition (with the liner 61). Accordingly, it was found that the use of the liner 61 increased the load efficiency by approximately 8%.

In addition, in the unloaded state (i.e. the parking brake lever is not pulled), the coil spring 56 had a free length of 150 mm. After the input load of 1,000 N was applied, the coil spring 56 had a compressed length of 129 mm. The return force of the coil spring 56 at this time point may be calculated as 39.69 N. Consequently, it was found that the return force of the coil spring 56 accounts for a loss of load efficiency of approximately 4%.

As was noted above, the load efficiency was approximately 81% under the first experimental condition (with the coil spring 56). On the other hand, the load efficiency was approximately 87 to 91% under the fourth experimental condition (without the coil spring 56). Therefore, it was found that friction between the coil spring 56 and the cable 54 is responsible for a significant loss of approximately 6 to 10%. It was also found that the loss due to the coil spring 56 is the dominant loss with respect to the load efficiency.

Second Embodiment

A cable-operated device 50a according to a second embodiment, which includes the above-mentioned elongated liner 71, will now be described with reference to FIG. 4, which is a partial cross-sectional view of the cable-operated device 50a. The elongated liner 71 extends through the inner hole of the coil spring 56 from the distal end portion of the coil spring 56 to an intermediate or middle portion of the coil spring 56 spaced from its distal end portion towards the lever 52. By fitting a first end 71a of the elongated liner 71 into the supporting member 58, the elongated liner 71 is mounted such that the elongated liner 71 is affixed to the supporting member 58. A second end 71b of the elongated liner 71 extends beyond the first end 64a of the guide portion 64 toward the lever 52 (the left-side in FIG. 4). The cable 54 is inserted into the inner hole of the elongated liner 71. Since the cable-operated device 50a (FIG. 4) and other components according to the second embodiment are the same or substantially similar to the cable-operated device 50 (FIG. 2) and the other components according to the first embodiment, a detailed description thereof may be omitted.

Figure 4:
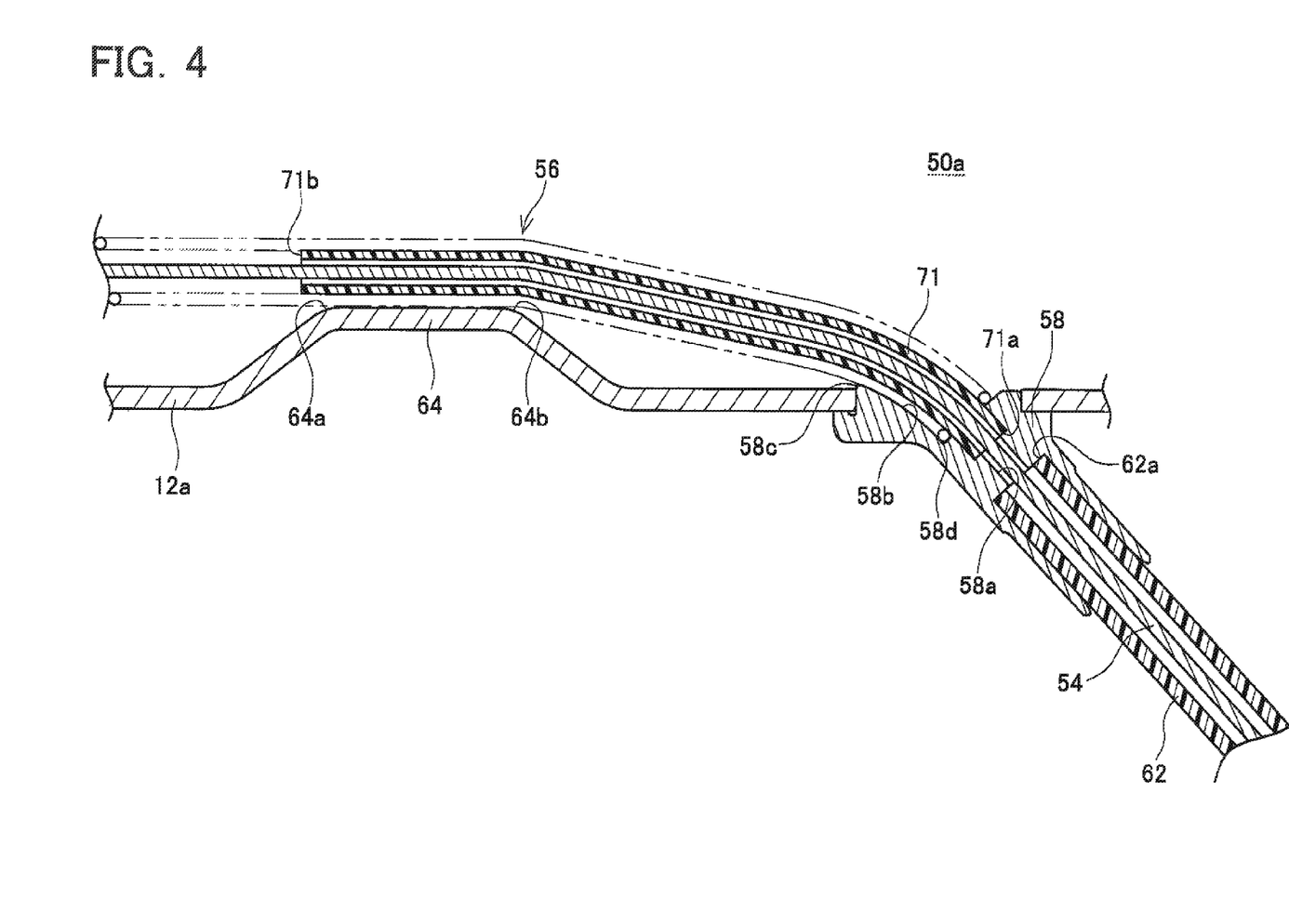
FIG. 4 is a partial cross-sectional view of a cable-operated device 50a according to a second embodiment.

As shown in FIG. 4, when the coil spring 56 is placed into the parking brake 10, the guide portion 64 contacts the side of the coil spring 56. The contact portion of the guide portion 64 is the portion that contacts the coil spring 56 between the first end 64a and the second end 64b. The coil spring 56 and the cable 54 are more likely to contact each other within this contact portion as well as portions that are longitudinally-adjacent the contact portion, if no countermeasures were to be taken. In addition, as shown in FIG. 4, the coil spring 56 is bent in the vicinity of the second end 64b of the guide portion 64.

In the cable-operated device 50a according to the second embodiment, the elongated liner 71 extends farther towards the lever 52 and beyond the first end 64a. Further, the cable 54 is separated or isolated from the coil spring 56 by the elongated liner 71 within the contact portion of the guide portion 64 and the coil spring 56. As a result, adjacent turns of the coil spring 56 can be prevented from becoming directly caught between the cable 54 and the guide portion 64. In addition, since the inner wall surface of the elongated liner 71 is smoother than the inner wall surface of the coil spring 56, the frictional force acting on the cable 54 can be reduced. Thus, losses due to friction between the coil spring 56 and the cable 54 can be further reduced by interleaving the elongated liner 71 between the cable 54 and the coil spring 56.

Returning to FIG. 3, it is noted that the load efficiency was approximately 89 to 90% under the second experimental condition (with the liner 61) and approximately 91% under the third experimental condition (with the elongated liner 71). Therefore, it was found that the load efficiency can be further increased by approximately 1 to 2% by disposing the elongated liner 71 along the contact portion of the guide portion 64 and the coil spring 56.

Third Embodiment

Figure 5:
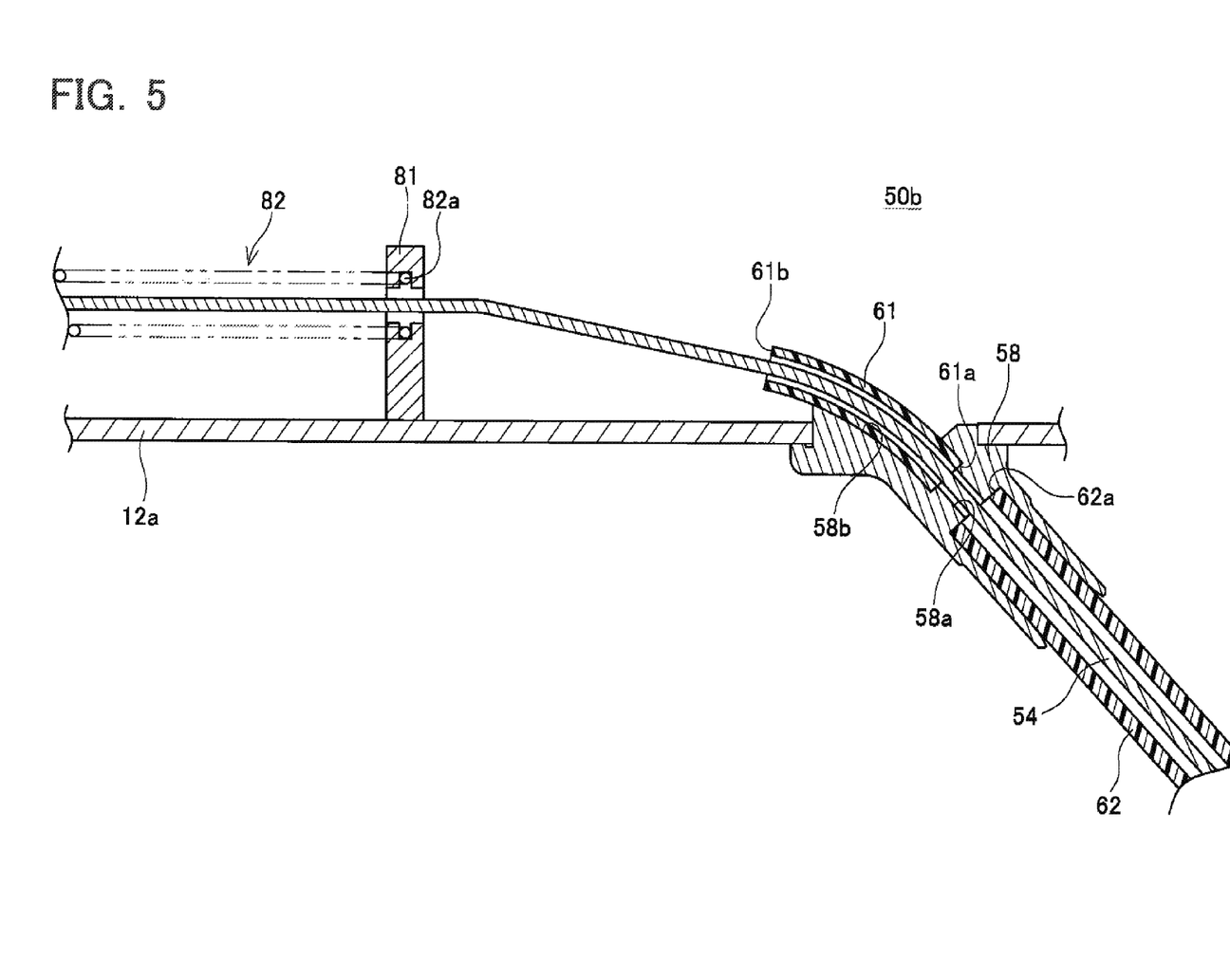
FIG. 5 is a partial cross-sectional view of a cable-operated device 50b according to a third embodiment.

A cable-operated device 50b according to a third embodiment will now be described with reference to FIG. 5, which is a partial cross-sectional view of another cable-operated device 50b that includes a bracket 81 and a coil spring 82. The coil spring 82 used in this third embodiment is shorter than the coil spring 56 used in the first and second embodiments. The bracket 81 is provided along the path of the cable 54 between the supporting member 58 and the lever 52. The bracket 81 is affixed to the base 12a. One coil end 82a of the coil spring 82 is affixed to the bracket 81. Since the cable-operated device 50b (FIG. 5) and other components according to the third embodiment are the same or substantially similar to the cable-operated device 50 (FIG. 2) and other components according to the first and second embodiments, a detailed description thereof may be omitted.

The operational effect or advantage of the bracket 81 will now be described. The coil end 82a is one axial end of the coil spring 82 and is supported by the bracket 81. As a result, the coil spring 82 is interposed between the lever 52 and the bracket 81 without bending the axial or longitudinal line of the coil spring 82. Since the coil spring 82 and the cable 54 are less likely to make contact with each other, the frictional loss of the cable can be reduced and the load efficiency can be increased thereby.

Grease (for example, silicone grease) may be applied to the cable 54 in order to further reduce frictional losses of the cable 54 during operation and thereby further increase the load efficiency.

Furthermore, a plurality of supporting members may be provided and a guide surface may be formed on each of the supporting members. Alternatively, guide surfaces may be formed on the ends of the lever 52. If a plurality of guide surfaces is provided, the length of the liner may be determined or set so that the liner is disposed in each contact portion where one guide surface contacts the coil spring 56.

We claim:
1. A device comprising:
a cable having a first end configured to be coupled to a brake mechanism;
a supporting member having a first guide surface supporting at least a first bent portion of the cable;
a coil spring having a first end configured to be affixed to the brake mechanism and a second end affixed to the supporting member, wherein a first portion of the cable extends through the coil spring;
a first liner interleaved between the cable and the coil spring at least along the first bent portion of the coil spring, the liner first having a first end affixed to the supporting member and a second end extending towards the brake mechanism beyond the first guide surface; and
a second liner having a first end affixed to the supporting member, the second liner being separate from the first liner;
wherein:
the first end of the first liner is spaced from the first end of the second liner in a longitudinal direction of the cable such that the supporting member is disposed between the first and second liners and
a second portion of the cable extends through the second liner.

2. The device as in claim 1, wherein at least an inner wall of the first liner exhibits a lower frictional resistance than a metal surface.

3. The device as in claim 2, wherein at least the inner wall of the first liner comprises a resin material.

4. The device as in claim 3, wherein the first liner is comprised of one of polybutylene terephthalate and polytetrafluoroethylene.

5. The device as in claim 4, further comprising:
a second guide surface longitudinally supporting a second bent portion of the coil spring disposed between the supporting member and the brake mechanism, wherein the first liner extends from the supporting member in the direction towards the brake mechanism beyond the second bent portion, and
a base configured to support the brake mechanism, wherein the second guide surface is defined as a protruding surface of the base that contacts the coil spring.

6. The device as in claim 5, wherein the device is installed in a parking brake of an automobile, the brake mechanism comprises a lever configured to actuate a brake shoe, and the cable and coil spring are attached to the lever.

7. The device as in claim 1, further comprising:
a second guide surface longitudinally supporting a second bent portion of the coil spring disposed between the supporting member and the brake mechanism,
wherein the first liner extends from the supporting member in the direction towards the brake mechanism beyond the second bent portion.

8. The device as in claim 7, further comprising:
a base configured to support the brake mechanism,
wherein the second guide surface is defined as a protruding surface of the base that contacts the coil spring.

9. The device as in claim 1, wherein:
the second end of the first liner does not extend all the way to the brake mechanism.

10. The device as in claim 1, further comprising:
at least a second guide surface longitudinally supporting a portion of the coil spring other than the first bent portion,
wherein the first liner has sufficient length so as to be interleaved between the coil spring and each of the first and second guide surfaces.

11. The device as in claim 1, wherein the device is installed in a parking brake of an automobile, the brake mechanism comprises a lever configured to actuate a brake shoe, and the cable and coil spring are coupled to the lever.

12. The device as in claim 1, wherein the first liner has an inner wall and the coil spring has an inner wall, the first liner inner wall being smoother than the coil spring inner wall.

13. A device, comprising:
a cable having a first end configured to be coupled to a brake mechanism;
a support having a first guide surface supporting at least a first curved portion of the cable;
a coil spring having a first end configured to be coupled to the brake mechanism, wherein at least a first portion of the cable extends through the coil spring;
a first liner surrounding the cable at least along a segment of the first curved portion of the coil spring that is supported by the first guide surface of the support, the first liner having a first end affixed to the support and a second end extending beyond the first guide surface in a longitudinal direction of the cable towards the brake mechanism; and
a second liner having a first end affixed to the support, the second liner being separate from the first liner;
wherein:
the first end of the first liner is spaced from the first end of the second liner in a longitudinal direction of the cable such that the support is disposed between the first and second liners,
at least a second portion of the cable extends through the second liner, and
the second end of the first liner does not extend all the way to the brake mechanism.

14. The device as in claim 13, wherein the coil spring has a second end affixed to the support and the first liner is interleaved between the cable and the coil spring along the first curved portion of the cable.

15. The device as in claim 14, further comprising:
a base configured to support the brake mechanism and defining a second guide surface on a protruding surface of the base,
wherein the second guide surface longitudinally supports a second bent portion of the coil spring disposed between the support and the brake mechanism, and
the first liner extends from the support in the direction towards the brake mechanism beyond the second bent portion.

16. A parking brake, comprising:
at least one brake shoe movable by a lever, and
the device according to claim 15, wherein the first end of the cable is coupled to the lever.

17. The device as in claim 13, wherein at least an inner wall of the first liner exhibits a lower frictional resistance than a metal surface.

18. The device as in claim 17, wherein the first liner is comprised of one of polybutylene terephthalate and polytetrafluoroethylene and the cable is a twisted wire.

19. The device as in claim 13, further comprising a bracket having an aperture, the cable extending through the aperture, wherein the coil spring has a second end affixed to the bracket and the bracket is spaced from the support in the longitudinal direction of the cable.

20. A parking brake, comprising:
at least one brake shoe movable by a lever, and
the device according to claim 13, wherein the first end of the cable is coupled to the lever.

* * * * *